US012766797B2

(12) United States Patent
Zawadka

(10) Patent No.: US 12,766,797 B2
(45) Date of Patent: Oct. 20, 2026

(54) APPARATUS FOR STAMPING A THERMOPLASTIC MATRIX COMPOSITE BLANK

(71) Applicant: DAHER AEROSPACE, Orly (FR)

(72) Inventor: Laurent Zawadka, Sainte Pazanne (FR)

(73) Assignee: DAHER AEROSPACE, Orly (FR)

(*) Notice: Subject to any disclaimer, the term of this patent is extended or adjusted under 35 U.S.C. 154(b) by 32 days.

(21) Appl. No.: 19/069,106

(22) Filed: Mar. 3, 2025

(65) Prior Publication Data

US 2025/0289194 A1 Sep. 18, 2025

(51) Int. Cl.

| | |
|---|---|
| ***B29C 70/46*** | (2006.01) |
| ***B29C 31/00*** | (2006.01) |
| ***B29C 31/08*** | (2006.01) |
| ***B29C 43/34*** | (2006.01) |
| ***B29C 43/36*** | (2006.01) |

(Continued)

(52) U.S. Cl.

CPC ............ *B29C 70/46* (2013.01); *B29C 31/008* (2013.01); *B29C 31/08* (2013.01); *B29C 31/085* (2013.01); *B29C 43/34* (2013.01); *B29C 43/36* (2013.01); *B29C 51/082* (2013.01); *B29C 51/261* (2013.01); *B29C 51/262* (2013.01); *B29C 51/46* (2013.01); *B29C 53/02* (2013.01); *B29C 53/04* (2013.01); *B29C 53/80* (2013.01); *B29C 70/345* (2013.01); *B29C 70/461* (2021.05); *B29C 70/541* (2013.01); *B29C 70/543* (2013.01); *B29C 70/56* (2013.01); *B29D 99/0003* (2013.01); *B29C 2043/3405* (2013.01);

(Continued)

(58) Field of Classification Search

CPC .................... B29C 2043/3411; B29C 51/262; B29C 70/56

See application file for complete search history.

(56) References Cited

U.S. PATENT DOCUMENTS 4,595,450 A * 6/1986 Pike ........................ B29C 70/56 425/442
4,778,375 A * 10/1988 Mente .................. B29C 51/262 269/170

(Continued)

FOREIGN PATENT DOCUMENTS

CN 208714531 U 4/2019
CN 210059448 U * 2/2020

(Continued)

*Primary Examiner* — Benjamin A Schiffman

(57) ABSTRACT

The invention relates to an apparatus for stamping thermoplastic matrix composite blanks, particularly those reinforced with continuous fibers such as carbon or glass. The disclosed apparatus incorporates a stamping device with a movable punch (800) and stamping die (500), a transfer frame (400) supporting a composite stamping blank (200), and a tensioning mechanism that maintains controlled forces on the blank during stamping. The transfer frame comprises at least two holding members (300) that grip the composite blank along its edges (220), ensuring precise positioning and a controlled tension. These holding members (300) cooperate with receiving members (550) attached to the stamping die, in retaining assemblies, firmly gripping edges of the blank while allowing guided translation and pivoting motions, setting a tension in the blank that prevent wrinkles appearance.

11 Claims, 9 Drawing Sheets

(51) Int. Cl.

| | |
|---|---|
| ***B29C 51/08*** | (2006.01) |
| ***B29C 51/26*** | (2006.01) |
| ***B29C 51/46*** | (2006.01) |
| ***B29C 53/02*** | (2006.01) |
| ***B29C 53/04*** | (2006.01) |
| ***B29C 53/80*** | (2006.01) |
| ***B29C 70/34*** | (2006.01) |
| ***B29C 70/54*** | (2006.01) |
| ***B29C 70/56*** | (2006.01) |
| ***B29D 99/00*** | (2010.01) |

(52) U.S. Cl.
CPC ................. *B29C 2043/3411* (2013.01); *B29C 2043/3483* (2013.01); *B29C 2043/3602* (2013.01)

(56) References Cited

U.S. PATENT DOCUMENTS 5,119,666 A * 6/1992 Fujiwara ................ B21D 28/12 72/472
5,207,963 A * 5/1993 Grace ................... B29C 51/262 425/403.1
5,863,568 A * 1/1999 Tomita .................. B29C 51/262 425/185
6,361,304 B1 * 3/2002 Petersen ............... B29C 51/262 425/384
6,733,271 B2 * 5/2004 De Nichilo ........... B29C 51/262 425/388
7,618,572 B2 * 11/2009 Coffield .................. B29C 70/56 425/383
7,677,873 B2 * 3/2010 Sayers .................... B29C 70/56 425/111
7,842,226 B2 * 11/2010 Polk, Jr. .................. B29C 51/18 425/388
8,999,096 B2 * 4/2015 De Mattia ............... B29C 70/30 156/443
9,044,906 B2 * 6/2015 Theinert ............... B29C 70/541
9,156,211 B2 * 10/2015 Coffield ................. A47C 7/282
10,391,721 B2 * 8/2019 Laberge Lebel ...... B29C 70/543
10,583,566 B2 3/2020 Hodde
10,639,840 B2 * 5/2020 Zawadka .............. B29C 59/026
11,524,425 B2 * 12/2022 Rigamonti .............. B29C 70/56
11,618,248 B2 * 4/2023 Brockschmidt ....... B29C 70/386 156/367
11,752,711 B2 * 9/2023 Wadsworth ........... B29C 70/543 264/257
12,103,249 B2 * 10/2024 Robins .................... B29C 70/38
12,109,768 B2 * 10/2024 Choi ..................... B29C 70/541
12,138,868 B2 * 11/2024 Sundquist ............... B29C 43/52
12,145,328 B2 * 11/2024 Waugh .................... B29B 11/16
12,304,163 B2 * 5/2025 Zawadka ................ B29C 43/34
12,330,382 B2 * 6/2025 Kitazawa ................ B29C 70/34
12,515,422 B2 * 1/2026 Tokutomi ................ B29C 53/04
2003/0146543 A1 * 8/2003 Lebrun ................. B29C 51/262 425/398
2015/0217488 A1 * 8/2015 Allman ................... B29C 43/18 264/258
2015/0258743 A1 9/2015 Lanard et al.
2015/0336337 A1 * 11/2015 Allman ................... B29C 70/56 700/98
2025/0345972 A1 * 11/2025 Sportelli ................. B29C 43/36
2026/0084382 A1 * 3/2026 Zawadka .............. B29C 70/541
2026/0084383 A1 * 3/2026 Zawadka .............. B29C 70/541

FOREIGN PATENT DOCUMENTS

DE 102014208705 A1 11/2015
KR 100388135 6/2003
WO 2014064085 A1 5/2014

* cited by examiner

BB

APPARATUS FOR STAMPING A THERMOPLASTIC MATRIX COMPOSITE BLANK

CROSS-REFERENCE TO RELATED APPLICATIONS

This application claims priority of French application #FR2402638 filed on Mar. 15, 2024.

BACKGROUND OF THE INVENTION

The invention belongs to the field of implementation of composite materials with a thermoplastic polymer matrix.

More specifically, the invention belongs to the field of shaping by stamping in which a blank in the form of a composite plate reinforced by fibers is shaped by deformation between a punch and a paired matrix.

Stamping is a technique for shaping thermoplastic matrix composite materials making it possible to obtain an undevelopable three-dimensional shape from a substantially planar stamping blank.

More particularly, when the composite stamping blank is reinforced by continuous fibers as a plies lamination, in particular fibers made of a material that does not exhibit plasticity, such as carbon or glass fibers, the deformation of the stamping blank during stamping, so that it conforms to the shapes of the punch and of the die, is achieved by interlaminar slipping between the plies.

To this end, a consolidated or semi-consolidated, yet rigid, stamping blank is heated to a temperature about or slightly higher than the melting point of the thermoplastic polymer matrix, before its stamping, thus enabling such a deformation mechanism.

The stamping blank, which is then in a deconsolidated state, is subjected to stamping and is reconsolidated in shape between the punch and the die at the end of this stamping process.

Before stamping and during a heating stage, the stamping blank is carried by a transfer frame as described in documents EP 3 065 931 B1 and EP 4 349 560 B1 which also allows a precise positioning of the blank relative to the stamping die.

These techniques of the prior art are satisfactory. However, when the final part (100) comprises a curved portion (110) as shown in FIG. 1 forming of this portion involves a constriction of some area, thus, such shrunk portion is prone to wrinkles appearance, which, in the final part, may result in waviness in the fibrous plies and even a wringing of the polymer matrix between the fibrous plies.

The wrinkle appearance phenomenon in a shrunk portion during stamping is essentially geometric, but in the case of a composite stamping blank reinforced with continuous fibers that do not exhibit plasticity, this phenomenon tends to spread over the entire part, including in non-constricted areas.

In addition to a potential shape deviation, defects such as plies waviness or inter-plies wringing of the matrix polymer, significantly drop the mechanical properties of the part to the point of making it unsuitable for demanding application such as in aeronautics, leading to its rejection. For that reason, such a part is simply not feasible in serial production by the stamping techniques of prior art.

SUMMARY OF THE INVENTION

With the aim of solving the shortcomings of the prior art, the disclosure provides support for an apparatus comprising:

- a stamping device comprising a stamping die and a movable punch vertically movable relative to the stamping die between an open position and a closed position, the closed position defining a gap between walls of the stamping die and walls of the movable punch;
- a composite stamping blank comprising reinforcing fibers in a thermoplastic polymer matrix;
- a transfer frame configured to support the composite stamping blank along at least two edges of the composite stamping blank and comprising an open area encompassing an outer perimeter of the stamping die;
- rails to move the transfer frame above the stamping die and between an upper position and a lower position relative to the stamping die;

wherein:

- the transfer frame comprises at least two holding members, each holding member being configured to maintain a holding portion of the composite stamping blank on each of the at least two edges;
- each holding member comprises a bore hole configured to cooperate with a centering pin of a receiving member attached to the stamping die;
- the stamping die comprises at least two receiving members configured to cooperate with the at least two holding members so as to connect each holding member with each receiving member by way of the centering pin when the transfer frame passes from the upper position to the lower position;
- each receiving member being attached to the stamping die by a pivot link about a horizontal axis; and
- each receiving member comprises at least one slide such that when the at least two holding members are connected to the at least two receiving members, the at least two holding members are guided in translation relative to the at least two receiving members in a sliding plane parallel to the horizontal axis and in a direction perpendicular to the horizontal axis.

Thus, the holding members being connected to the receiving members, those holding members exert on the composite stamping blank a tension during the stamping operation, while accompanying holding portions rotations during the forming, thus avoiding the appearance of wrinkles.

The apparatus may be implemented according to the embodiments and variants exposed hereafter, which are to be considered individually or according to any technically operative combination.

According to some embodiment, the at least two holding members are clamps.

In some embodiment, the at least two holding members may comprise claws configured to be inserted into maintaining holes drilled in the at least two edges of the composite stamping blank.

In some embodiment, the at least two holding members may comprise a cover covering an area in which the claws are located.

Consequently, the portion of the composite stamping blank laying in the clamp is not deconsolidated during the heating of the composite stamping blank, thus ensuring a firm grip of this portion during the heating and the stamping operations.

In some embodiment, the pivot link may comprise a first indexing mechanism configured to indexing the pivot link in a position about the horizontal axis for receiving the at least two holding members when the transfer frame moves from the upper position to the lower position According to some embodiment, the first indexing mechanism may comprise an adjustable setting of a de-indexing torque about the horizontal axis.

According to some embodiment, the at least two receiving members may comprise a spring configured for opposing a force to a displacement in translation of the at least two holding members with respect to the at least two receiving members.

In some embodiment, the apparatus may comprise a ball bearing mounted on the centering pin and configured to cooperate with an upper slide for guiding each holding member in translation relative to each receiving member.

Such arrangement makes it possible to bear the transversal forces arising from the tensioning of the composite stamping blank and thus to ensure the absence of jamming during the translation of the holding members relative to the receiving members when subjected to these transversal forces.

In some embodiment the apparatus may comprise a tether and a tensioner configured to control a tipping torque of the at least two receiving members about the horizontal axis during a stamping.

The variable tensioner may further comprise a computer comprising a non-transient memory comprising a control program for controlling the tensioner and the tipping torque as a function of a parameter measured during stamping, the parameter being selected among a displacement of the movable punch and a force applied to the movable punch or combination thereof.

According to some embodiments, the reinforcing fibers may be selected from continuous fibers, long fibers and short fibers.

BRIEF DESCRIPTION OF DRAWINGS

The apparatus may be implemented according to the nonlimiting embodiments and variants exposed hereafter and in reference to FIG. 1 to FIG. 9 in which.

In order to facilitate reading, not all the parts are shown from one figure to another.

DETAILED DESCRIPTION OF THE INVENTION

Figure 1:
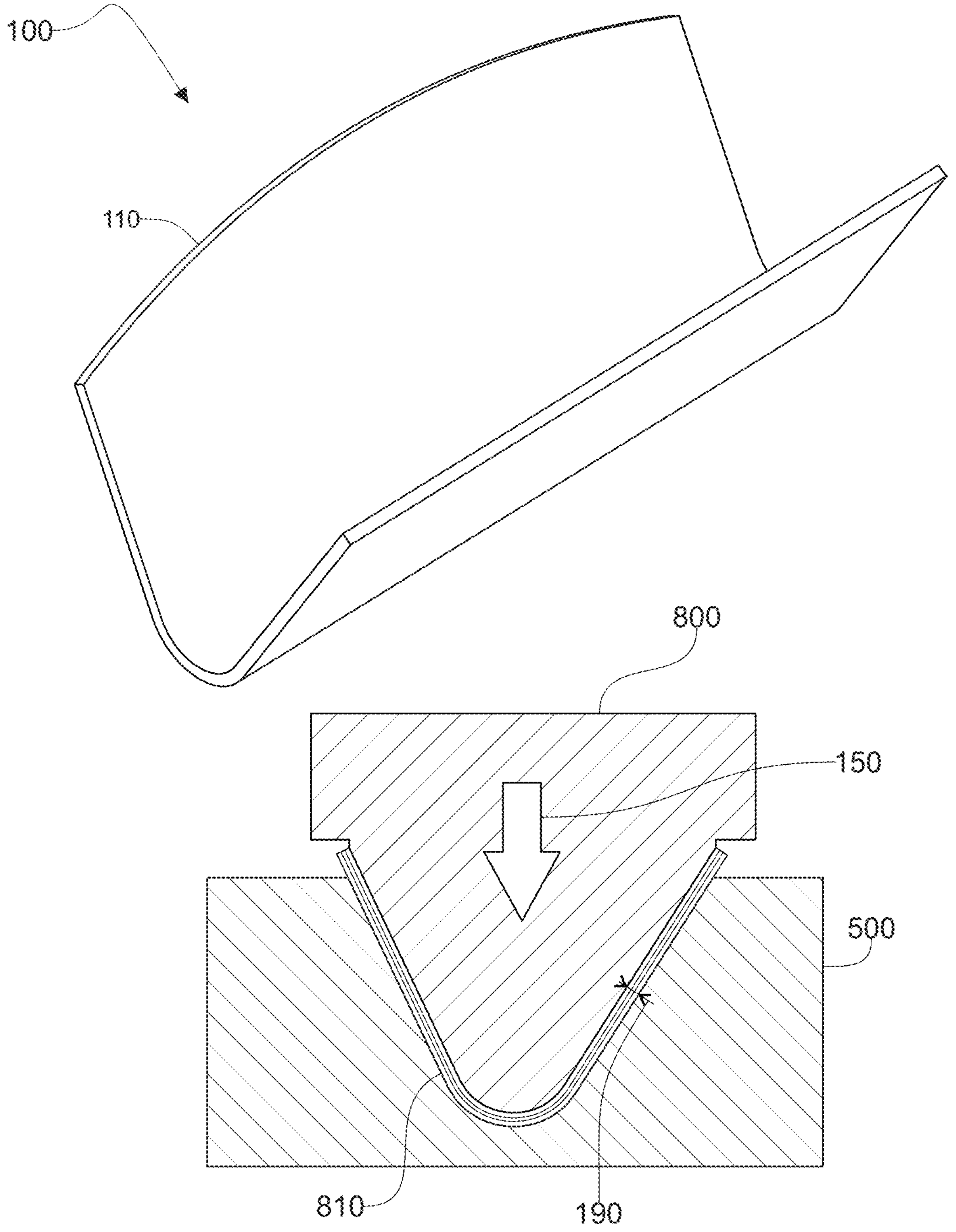
FIG. 1 shows according to a perspective view an example of a part made by implementing the apparatus and a diagrammatic view in cross section of a stamping operation.

FIG. 1 the principle of stamping consists in shaping an initially substantially planar blank between a stamping die (500) comprising an imprint (810) and a paired movable punch (800), the punch being movable between an open and a closed position, where in the closed position an outer shape of the movable punch is distant from a shape of the imprint by a gap (190) corresponding to the thickness of the finished part.

This forming is carried out by a relative movement (150) of the movable punch (800) toward the stamping die (500).

Throughout the text, the notions of vertical or horizontal are relative and given in relation to the relative stamping movement of the movable punch with respect to the stamping die, this movement being considered as vertical. As a matter of fact, when the tooling is mounted on a press, this movement is, in most cases, carried out in a vertical direction.

The person skilled in the art understands that the direction of relative movement of the movable punch with respect to the stamping die may be carried out, on other implemented machines, in other directions, in particular horizontal, without modifying the operation of the apparatus. Thus, the vertical direction is by convention the direction of movement of the movable punch, imposed by the press, during stamping.

Figure 2:
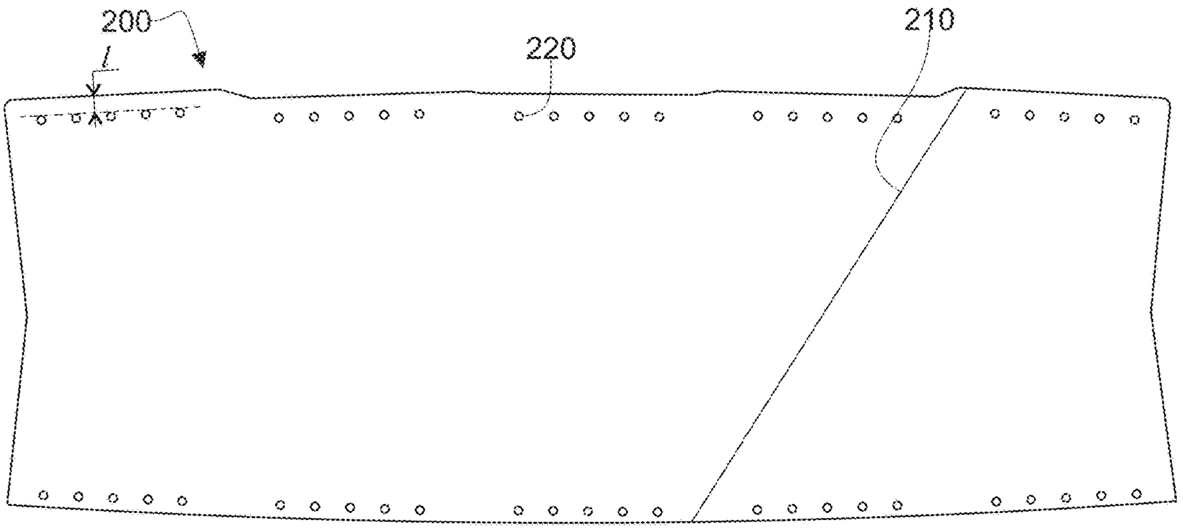
FIG. 2 shows according to a top view an exemplary embodiment of a composite stamping blank for making the part shown FIG. 1.

FIG. 2 according to some embodiment, the part shown FIG. 1 is obtained by stamping a substantially planar composite stamping blank (200) consisting of a laminated composite, comprising plies of continuous fibers (210), that is to say fibers extending from one edge to the other of the composite blank, and a thermoplastic polymer matrix.

According to some embodiments, the composite stamping blank (200) is cut out by abrasive water jet or by a cutting tool in a fully consolidated plate or may be obtained by a method as described in document EP 2 819 823 or may also be partially consolidated and obtained by draping pre-impregnated plies or by automated fiber placement as described in documents EP 3 096 940 and US 2018/0319102.

According to nonlimiting embodiments and more particularly for aeronautical applications, the thermoplastic polymer making the matrix may be selected from PEI, PPS, PEEK, PEK, PEKK or LMPAEK®, with:

PEI: polyetherimide,

PPS: poly(phenylene sulfate),

PEEK: polyetheretherketone,

PEK: polyetherketone,

PEKK: polyetherketoneketone, and

LMPAEK® "Low Melting PolyArylEtherKetone", trade name of a low melt temperature polyaryleterketone distributed by VICTREX PLC Technology Centre Hillhouse International, Thornton FY5 4QD, United Kingdom.

According to nonlimiting examples, the fibrous plies may comprise carbon fibers, glass fibers or aramid fibers in the form of a fabric, a non-woven fabric, a non-woven unidirectional web or may be deposited by automated fiber placement.

Regardless of the embodiment, the composite stamping blank is rigid at room temperature and shall be brought to a temperature close to and generally slightly higher than a melting point of the thermoplastic polymer matrix so as to enable the shaping by stamping.

This heating may be achieved by the traveling of the composite stamping blank, laying on a transfer frame, under infrared radiant panels. The transfer frame may also allow heating on both sides of the composite stamping blank.

The composite stamping blank may comprise a plurality of maintaining holes (220) with a diameter comprised between 2 mm and 5 mm, depending on the thickness of the blank, which may be drilled and distributed over at least two opposite edges of the blank.

An edge of the bore holes spacing may be set at a distance I from an edge of the composite stamping blank, with I being at least equal to a thickness of the blank.

Figure 3:
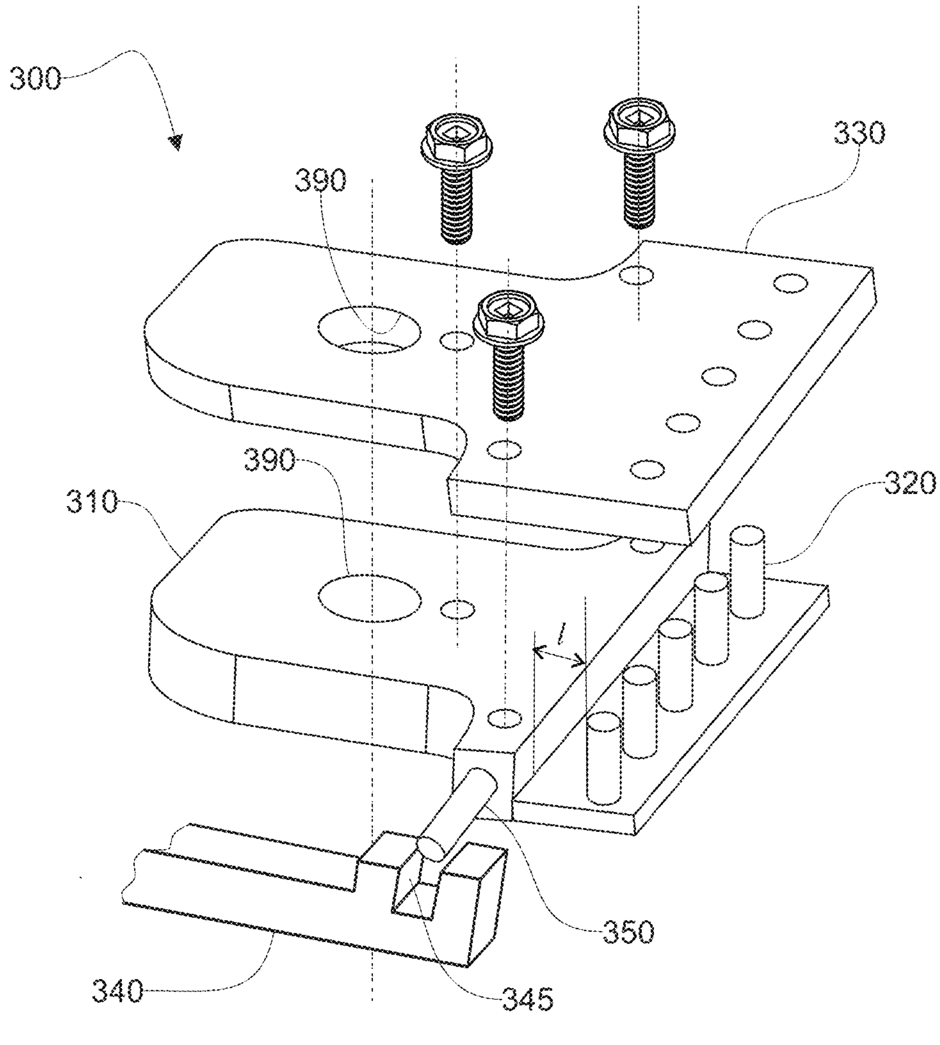
FIG. 3 is a partial perspective and exploded view of an exemplary embodiment of a holding member.

FIG. 3 the bore holes at the at least two opposite edges of the composite stamping blank may be configured to cooperate with holding members (300).

Each holding member comprises a holding base (310), which, according to some embodiment, may comprise claws (320) configured to be inserted into the maintaining holes (220) when the blank lays on the transfer frame. However, for some applications, the holding members may also be clawless clamps.

A cover (330) may be assembled to the holding base covering a portion of the edge, in the vicinity of the maintaining holes.

In some embodiment the holding member (300) may rest on two arms (340) extending on either side of the holding base (310). The holding base comprises hanging rods (350) configured to be inserted in open notches (345) located at an end of each of the two arms (340).

Figure 4:
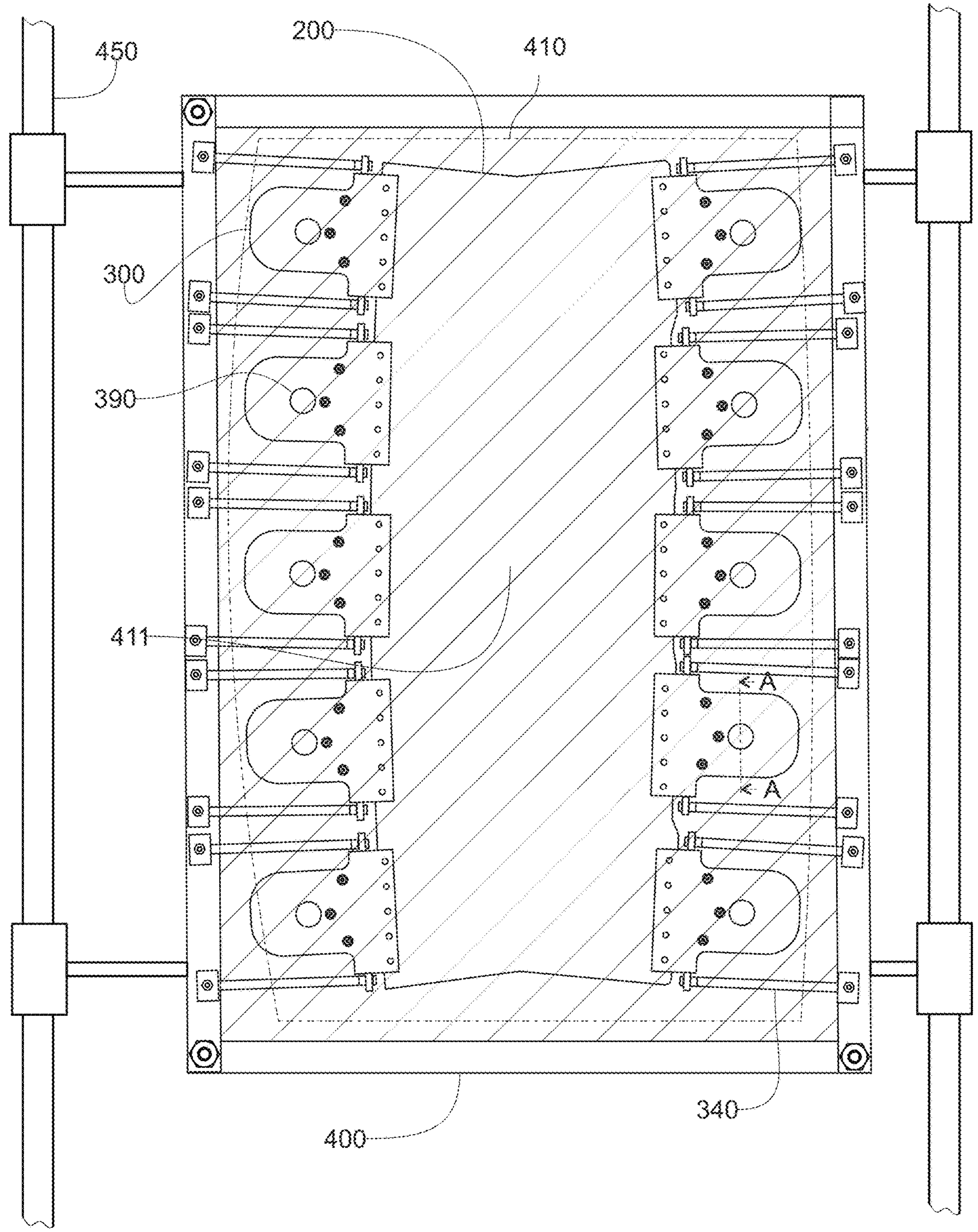
FIG. 4 shows according to a top view an exemplary embodiment of a transfer frame configured to support the composite stamping blank of FIG. 2 and implementing the holding members of FIG. 3.

FIG. 4 on an opposite end of the notches (345) the two arms (340) are connected to the transfer frame (400).

The position and the orientation of the two arms (340) relative to the transfer frame (400) may be adjustable.

FIG. 3, the holding base (310), the cover (330), the claws (320) and the two arms (340) may be made of steel, for example a steel with a low thermal expansion coefficient such as a Nickel-Iron alloy steel known as INVAR®, so as to minimize the differential expansion stresses when the composite stamping blank is heated.

In addition to holding the composite stamping blank in position, the cover (330) provides thermal protection, limiting a temperature rise in an area of the blank edge portion located under the cover, so that this area may hold the composite stamping blank and withstand a tension of the blank during stamping.

In order to enable interlaminar slippage during stamping, the composite stamping blank may be brought to a temperature of Tf+30° C. to Tf+50° C. where Tf is a melting point of the thermoplastic polymer matrix. The portions of the edges of the composites stamping blank hold in the holding members over a distance I between the claws (320) and the edge of the blank, protected by the cover, may reach a slightly lower temperature in a range of Tf−20° C. to Tf−5° C. so as to enable these portions to be maintained during the stamping.

FIG. 4 the composites stamping blank (200) is installed on the transfer frame (400) and secured thereto by at least two holding members (300) their respective two arms (340) each holding member (300) gripping a holding portion of the blank, the at least two holding portions being gripped by the at least two holding members being located on opposite edges of the composite stamping blank.

The transfer frame (400) may be conveyed by rails (450) under radian panels (not shown) for a time sufficient for the blank to be heated to a temperature high enough during a holding time long enough for the thermoplastic polymer matrix to be deconsolidated outside the portions held by the holding members.

The transfer frame (400) bearing the deconsolidated composite stamping blank may then be placed between the stamping matrix and the movable punch, in an upper position of the frame, above the stamping matrix.

The transfer frame (400) comprises an open area (411), shown hatched in FIG. 4, encompassing an outer perimeter (410) of the stamping die. Thus, starting from the upper position, the transfer frame (400) bearing the deconsolidated composite stamping blank may be lowered towards the stamping die, down to a lower position.

FIG. 3, the at least two holding members (300) may comprise a centering and positioning arrangement, configured to cooperate with holding and positioning means carried by the stamping die. According to some embodiment, this arrangement comprises, on the holding member side, a bore hole (390) passing through the holding base (310) and the cover (330) outside of the composite stamping blank gripping area.

According to variants, the bore hole (390) may be cylindrical or conical.

Figure 5:
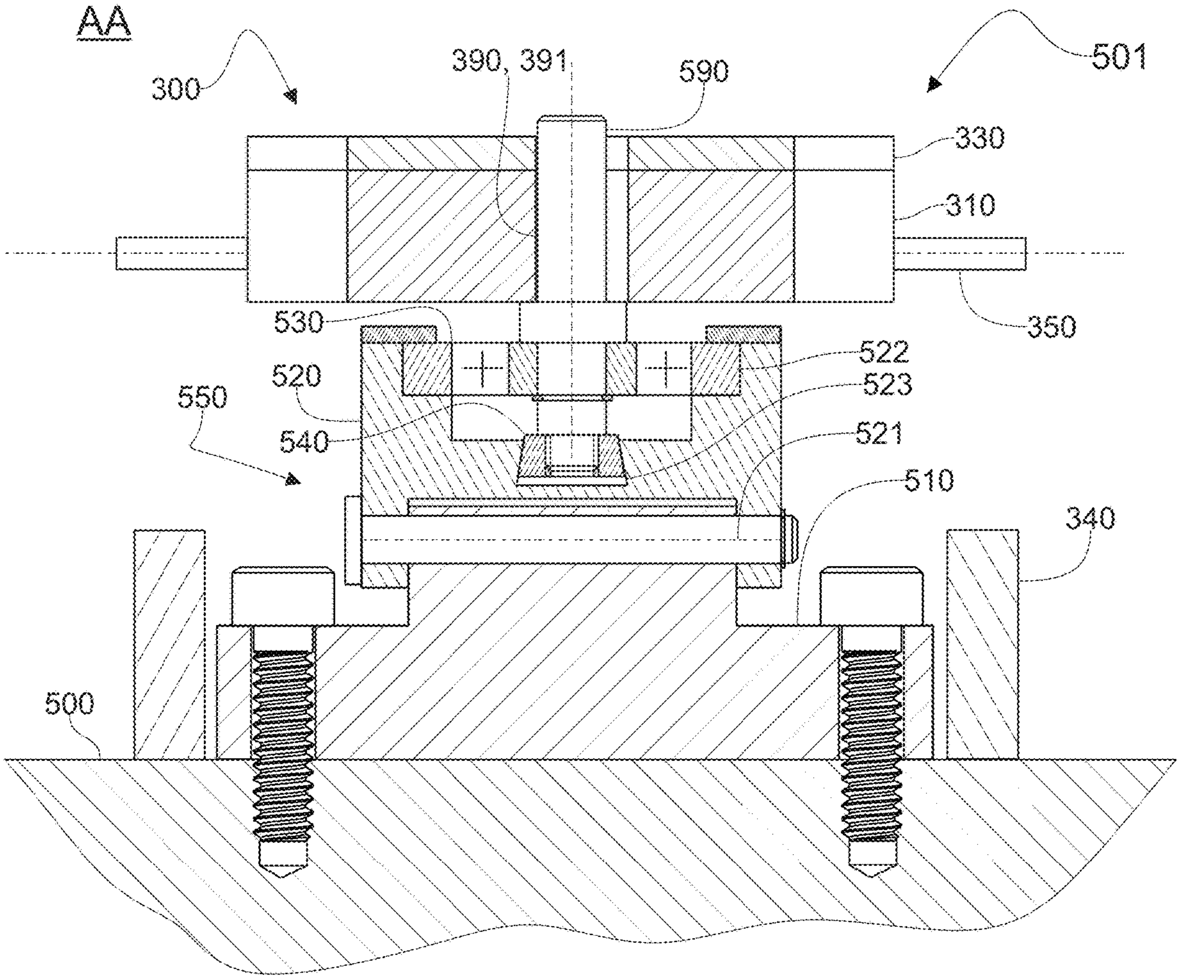
FIG. 5 is a sectional view AA defined in FIG. 4 showing an exemplary embodiment of an assembly comprising a holding member and a receiving member.

FIG. 5, when the transfer frame is in the lower position, the hanging pins (350) of each holding member (300) are released from the two arms (340). The stamping die (500) may comprise at least two receiving members (550) attached to the stamping die, each receiving member facing each holding member.

Each receiving member (550) may comprise a substantially vertical centering pin (590), configured to fit into the bore hole (390), such that when the transfer frame moves from the upper position to the lower position, the centering pin (590) inserts into the bore hole (390).

An assembly comprising a holding member linked by a centering pin (590) to a receiving member (550) is designated as a retaining assembly (501).

The holding member may pivot around the centering pin (590). According to a particular embodiment, as shown in FIG. 5, for one or more holding members (300), the bore hole (390) may be an oblong bore hole (391) that enables a limited lateral displacement of the holding member (300) relative to the centering pin (590) in addition to the pivoting during the stamping.

According to some embodiment, the receiving member (550) comprises a receiving base (510) attached to the stamping die (500) and a guiding upper part (520) connected to the receiving base (510) by a pivot link around a horizontal axis (521) and substantially parallel to a portion of the edge of the composite stamping blank, a portion that is held in the holding member (300) connected to this same receiving member.

The guiding upper part (520) may comprise at least one slide for guiding the centering pin (590) in a direction substantially perpendicular to the horizontal axis (521) of the pivot link.

According to some embodiment, the centering pin (590) may be guided in an upper slide (522) comprising straight grooves, by a ball bearing (530) whose effect is essentially to withstand lateral forces during the stamping, as well as in a lower slide (523), that may comprise a dovetail groove cooperating with a tapered gib (540) connected to an end of the centering pin, the lower slide providing a guiding parallel to the upper slide one.

Figure 7:
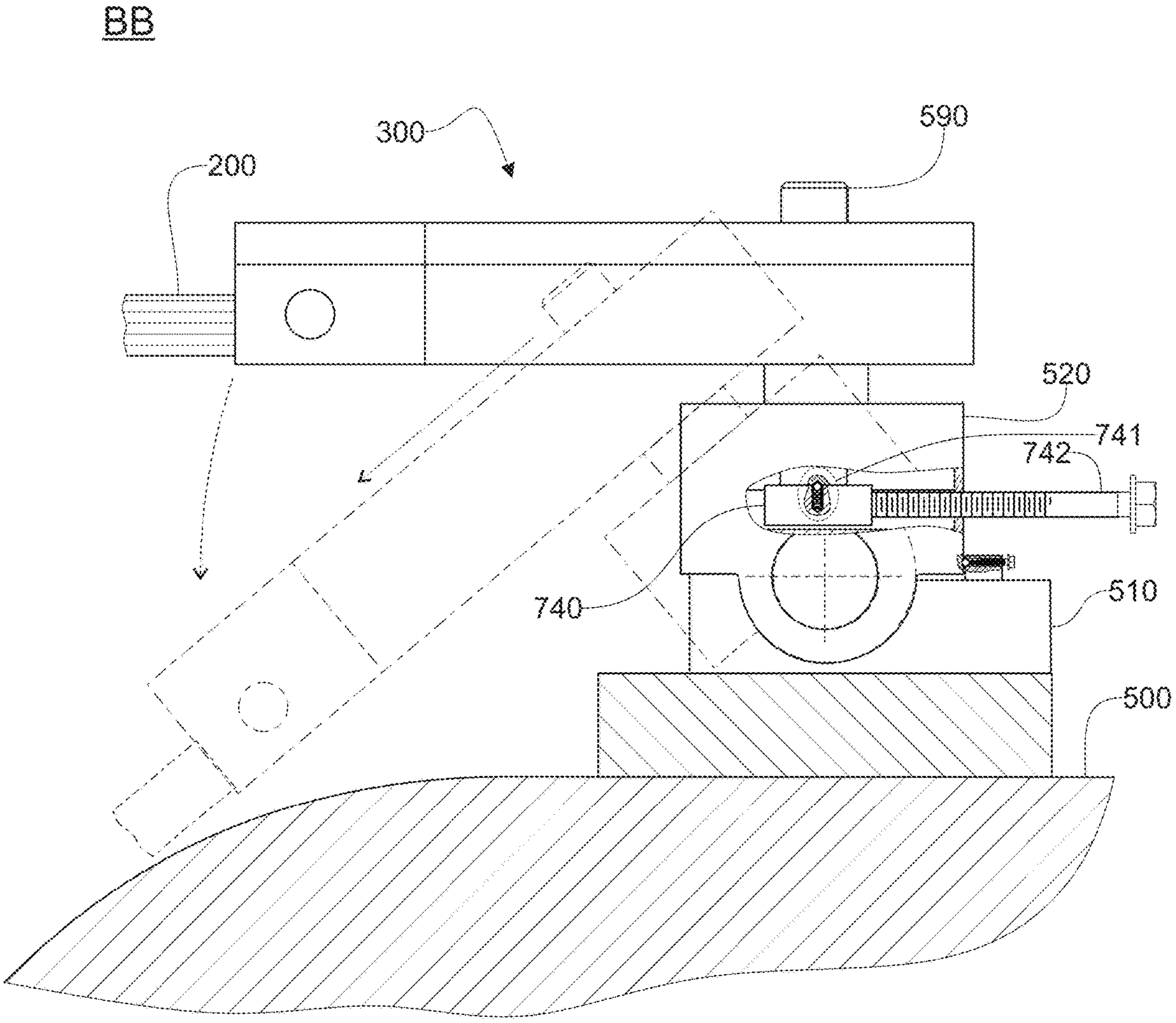
FIG. 7 shows, in a partial view according to a BB section, another embodiment of a retaining assembly.

According to some other embodiment, FIG. 7, the gib (740) does not guide the centering pin and only provides an initial positioning of it, before stamping, via a second indexing mechanism (741), thus ensuring a positioning of the centering pin (590) and its alignment with the bore hole (390) during the movement of the transfer frame from the upper position towards the stamping die. A screw (742) may be used to adjust the initial position of the gib (740) and the centering pin (590).

Figure 6:
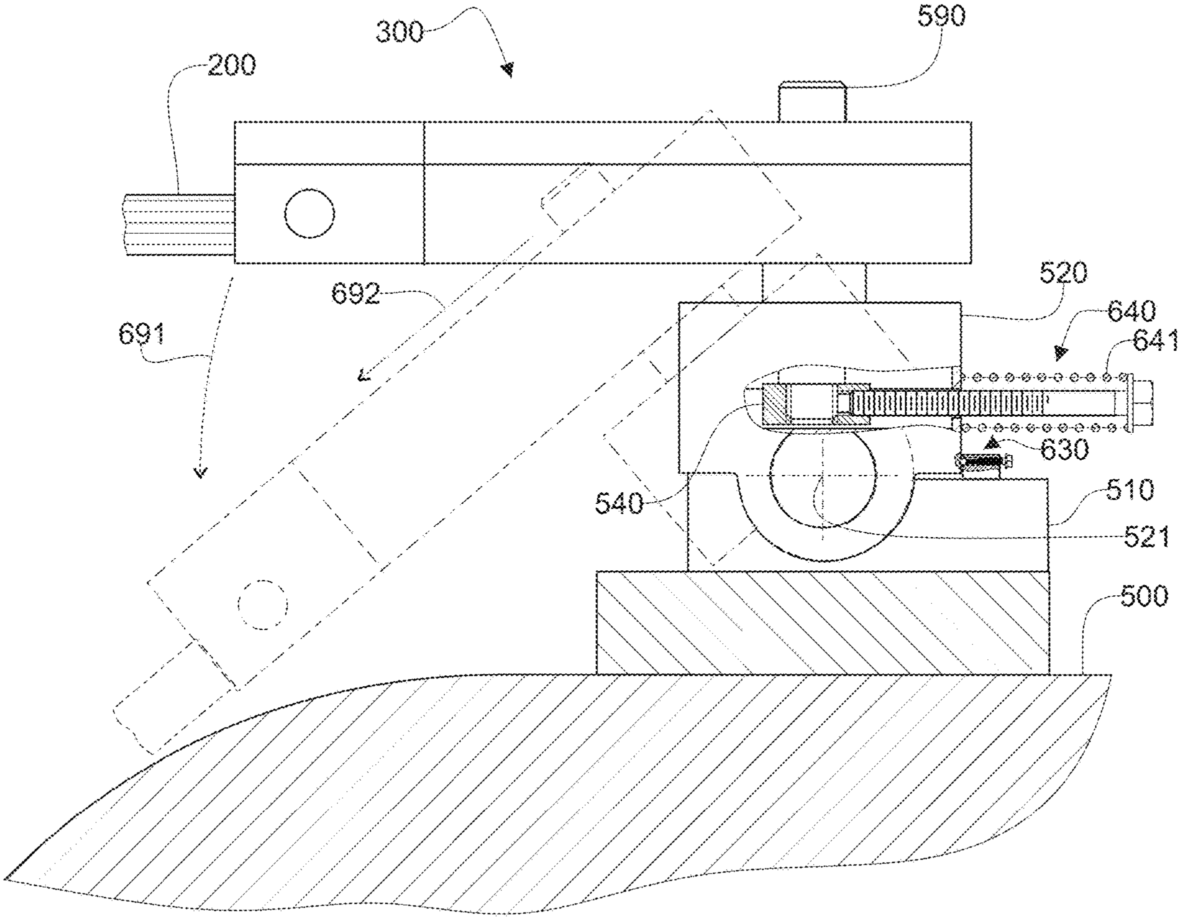
FIG. 6 is a partial sectional view BB defined in FIG. 9 showing an exemplary embodiment of a retaining assembly comprising a holding member and a receiving member.

FIG. 6, according to some embodiment, the receiving member may comprise a first indexing mechanism (630) that maintains the guiding upper part (520) in a configuration where the centering pin (590) is vertical. A torque at which the guiding upper part (520) deindexes from the receiving base (510) by a pivoting around the horizontal axis (521) of the pivot link may be adjustable.

FIG. 7 the second indexing mechanism (741) may be calibrated so as to release the centering pin in translation for a given force.

Thus, during the movement of the transfer frame from the upper position to the lower position and before the stamping operation, the centering pins (590) of the receiving members get inserted into the corresponding bore holes of the holding members (300) and the holding members when resting on the receiving members are substantially horizontal.

For carrying out the stamping operation, the movable punch is moved towards the stamping die (500) according to the vertical direction and in doing so, exerts a forming pressure on the composite stamping blank, urging it against the walls of the imprint.

Under the effect of this forming action on the composite stamping blank, the guiding upper parts (520) of the receiving members de-index and move according to a tilting motion (691) around their pivot link, accompanying the shaping of the blank.

Similarly, in the embodiment shown FIG. 7 the centering pin (590) de-indexes from the gib (740) allowing the relative sliding of the holding member (300) relative to the guiding upper part (520).

Holding portions of the composite stamping blank (200) held in the holding members (300) remain firmly maintained.

As the stamping progresses, the centering pin (590) and the holding member (300) move according to a sliding motion (692) relative to the guiding upper part (520) guided in translation by the ball bearing and the tapered gib (540) in their respective slides According to some embodiment, the retaining assembly may comprise an adjustment mechanism (640) of the force opposing the sliding, for example by means of a spring (641).

Figure 8:
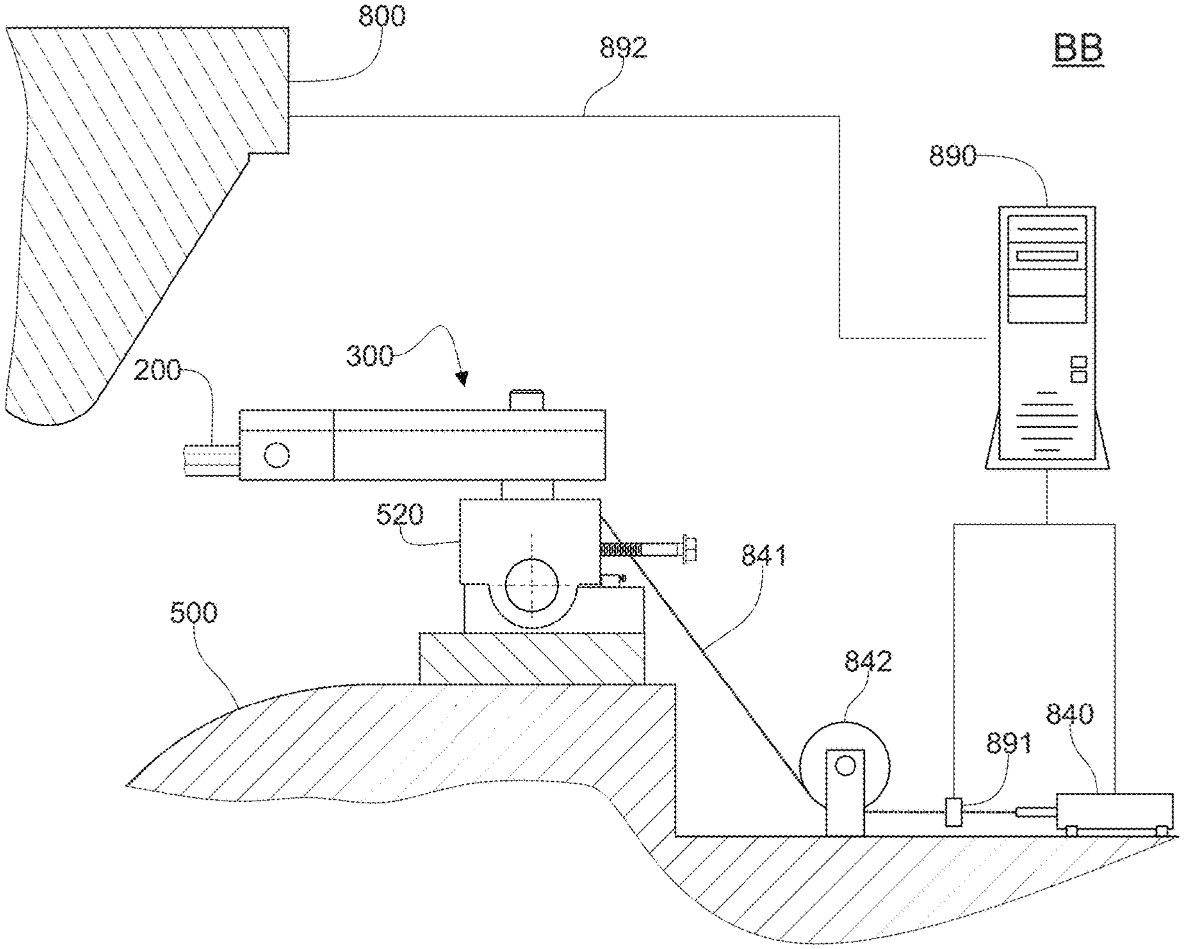
FIG. 8 shows in a partial view according to a BB section, another embodiment of a retaining assembly comprising means for adjusting a tipping torque of a guiding upper part

FIG. 8, according to some embodiment, compatible with the previous ones, the apparatus may comprise means for controlling a tipping torque of the guiding upper part (520).

According to some embodiment, these control means may comprise a tensioner (840) configured to apply a tension on a tether (841) such as a cable or a chain, connected to a guiding upper part (520) of a retaining assembly, via a pulley (842).

The tensioner may be a calibrated spring, or according to some other embodiment, the tensioner may be an actuator such as an electric cylinder or a chain cylinder, controlled by a computer (890) so as to apply a defined tension in the tether (841). Such a tension may be measured by a force sensor (891) and controlled by a program according to information (892) relating to a vertical position of the movable punch or to a force applied to the movable punch (800) or a combination thereof.

Such a control means may act on all or part of the retaining assemblies according to a same control profile or according to force control profiles adapted for each retaining assembly.

These control profiles may be determined by simulations and/or tests prior to the implementation in serial production of the stamping apparatus.

In addition, these control means also make it possible to avoid any collision between the movable punch (800) and the holding members (300) during the stamping.

Figure 9:
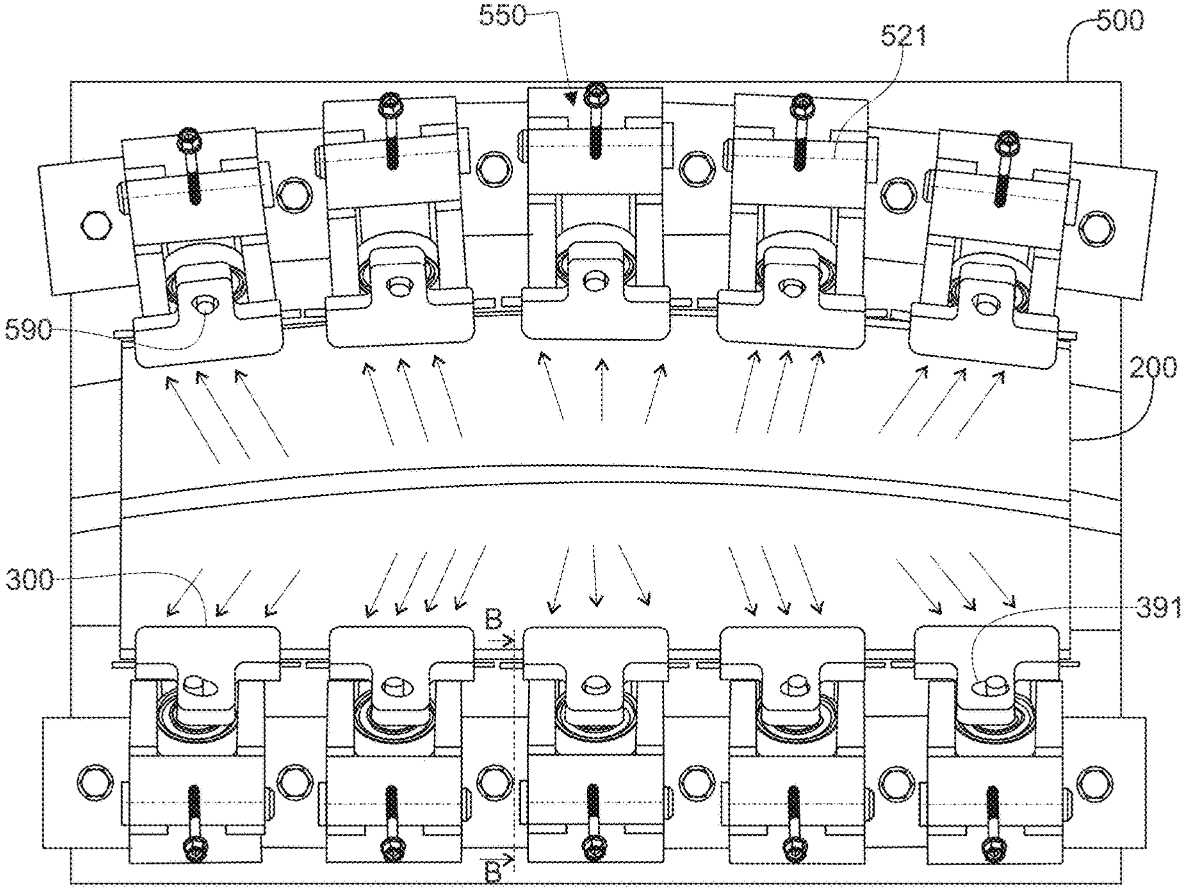
FIG. 9 is a top view of a stamping die comprising a plurality of retaining assemblies, and the composite stamping blank after stamping, as well as the forces exerted by the holding members on the composite stamping blank during the stamping.

FIG. 9 the distances between the holding members (300) attached to their respective receiving members (550) are substantially constant during the stamping.

According to some variants, the bore holes (390) are cylindrical and only allow an angular displacement of the holding members (300) about the centering pin (590), which holding members align with the tensions generated in the composite stamping blank (200) during stamping.

According to some other variant, the bore hole of at least one of the holding members (300) is an oblong bore hole (391), and thus allows, in addition to the angular alignment, a limited lateral displacement in translation of the holding members comprising such an arrangement.

Regardless of the variant, these retaining assemblies provide both accompaniment of the composite stamping blank (200) during its shaping, thus avoiding any tear or blockage, while exerting some tensions on the blank during stamping, tensions which are symbolized by the arrows shown in FIG. 9, thus avoiding the appearance of wrinkles The application of these tensions, which may vary during the stamping process, is adjusted, if necessary, individually for each retaining assembly, by at least one of the following parameters:

- the position of the receiving member (550) in relation to the imprint;
- the deindexing torque of the translational guiding part of the receiving member relative to its receiving base;
- the force opposing the translation of the centering pin in the slides;
- the means for controlling the tipping torque of the upper guiding portion; and
- the shape of the bore hole in the holding member cylindrical or oblong and the maximum permitted lateral play of the centering pin (590) in this bore hole.

These settings, as well as the number of retaining assemblies for a given stamping operation, are determined by experience, preliminary tests and with the help of numerical simulations if needed. Once these settings are determined, they remain constant for the entire series of parts made.

Although the apparatus described above is particularly suited for forming by stamping a composite blank with a thermoplastic matrix reinforced by continuous fibers, the appearance of wrinkles when shaping a blank in a shape comprising a shrunk area may also be relevant for a composite blank of another nature, in particular thermoplastic composites reinforced by long (noncontinuous) fibers or short fibers, or not reinforced or reinforced by thermoplastic fibers with a certain plasticity at the stamping temperature.

The apparatus described above remains relevant for shaping these other materials by stamping.

The description above and the examples of implementation show that the apparatus achieves the intended purpose, more particularly, it makes possible to tension a thermoplastic composite blank, in particular reinforced by continuous fibers without ability for plastic deformation such as carbon or glass fibers, so as to avoid the appearance of wrinkles in a forming by stamping comprising a shrunk area.

REFERENCE SIGNS LIST

100: final part
110: curved portion
150: relative movement
190: gap
200: Composite stamping blank
210: Continuous fiber
220: Maintaining holes
300: Holding member
310: Holding base
320: claw
330: cover
340: Two arms
345: notch
350: Hanging pin
390: Bore hole
391: Oblong bore hole
400: Transfer frame
410: Outer perimeter
411 Open area
450: rail
500: Stamping die
501: Retaining assembly
510: Receiving base
520: Guiding upper part
521: Horizontal axis
522: Upper slide
523: Lower slide
530: Ball bearing
540: Tapered gib
550: Receiving member
590: Centering pin
630: Indexing mechanism
640: Adjustment mechanism
641: Spring
691: Tilting motion
692: Sliding motion
740: gib
741: Second indexing mechanism
742: screw
800: Movable punch
810: imprint
840: tensioner
841: tether
842: pulley
890: computer
891: Force sensor
892: information

The invention claimed is:

1. An apparatus comprising:

a stamping device comprising a stamping die and a movable punch vertically movable relative to the stamping die between an open position and a closed position, the closed position defining a gap between walls of the stamping die and walls of the movable punch;

a composite stamping blank comprising reinforcing fibers in a thermoplastic polymer matrix;

a transfer frame configured to support the composite stamping blank along at least two edges of the composite stamping blank and comprising an open area encompassing an outer perimeter of the stamping die;

rails to move the transfer frame above the stamping die and between an upper position and a lower position relative to the stamping die;

wherein:

the transfer frame comprises at least two holding members, each holding member being configured to maintain a holding portion of the composite stamping blank on each of the at least two edges;

each holding member comprises a bore hole configured to cooperate with a centering pin of a receiving member attached to the stamping die;

the stamping die comprises at least two receiving members configured to cooperate with the at least two holding members so as to connect each holding member with each receiving member by way of the centering pin when the transfer frame passes from the upper position to the lower position;

each receiving member being attached to the stamping die by a pivot link about a horizontal axis; and each receiving member comprises at least one slide such that when the at least two holding members are connected to the at least two receiving members, the at least two holding members are guided in translation relative to the at least two receiving members in a sliding plane parallel to the horizontal axis and in a direction perpendicular to the horizontal axis.

2. The apparatus of claim 1, wherein the at least two holding members are clamps.

3. The apparatus of claim 1, wherein the at least two holding members comprise claws configured to be inserted into maintaining holes drilled in the at least two edges of the composite stamping blank.

4. The apparatus of claim 3, wherein the at least two holding members comprise a cover covering an area in which the claws are located.

5. The apparatus of claim 1, wherein the pivot link comprises a first indexing mechanism configured to indexing the pivot link in a position about the horizontal axis for receiving the at least two holding members when the transfer frame moves from the upper position to the lower position.

6. The apparatus of claim 5, wherein the first indexing mechanism comprises an adjustable setting of a de-indexing torque about the horizontal axis.

7. The apparatus of claim 1, wherein the at least two receiving members comprise a spring configured for opposing a force to a displacement in translation of the at least two holding members with respect to the at least two receiving members.

8. The apparatus of claim 1, comprising a ball bearing mounted on the centering pin and configured to cooperate with an upper slide for guiding each holding member in translation relative to each receiving member.

9. The apparatus of claim 1, comprising a tether and a tensioner configured to control a tipping torque of the at least two receiving members about the horizontal axis during a stamping.

10. The apparatus of claim 9, comprising a computer comprising a non transient memory comprising a control program for controlling the tensioner and the tipping torque as a function of a parameter measured during stamping, the parameter being selected among a displacement of the movable punch and a force applied to the movable punch.

11. The apparatus of claim 1, in which the reinforcing fibers are selected among continuous fibers, long fibers and short fibers.

* * * * *